United States Patent
Krishna

(10) Patent No.: US 7,665,133 B2
(45) Date of Patent: Feb. 16, 2010

(54) SYSTEM AND METHOD FOR MONITORING PROCESSING IN A DOCUMENT PROCESSING PERIPHERAL

(75) Inventor: Girish R. Krishna, Torrance, CA (US)

(73) Assignees: Toshbia Tec Kabushiki Kaisha (JP); Toshiba Corporation (JP)

( * ) Notice: Subject to any disclaimer, the term of this patent is extended or adjusted under 35 U.S.C. 154(b) by 848 days.

(21) Appl. No.: 10/866,337

(22) Filed: Jun. 12, 2004

(65) Prior Publication Data
US 2005/0278780 A1    Dec. 15, 2005

(51) Int. Cl.
   *G06F 21/00*    (2006.01)
   *G06F 12/14*    (2006.01)
(52) U.S. Cl. ........................................... 726/22
(58) Field of Classification Search ............ 726/22
   See application file for complete search history.

(56) References Cited

U.S. PATENT DOCUMENTS

| | | | | |
|---|---|---|---|---|
| 4,924,320 | A * | 5/1990 | Tanaka et al. | 358/296 |
| 5,953,530 | A * | 9/1999 | Rishi et al. | 717/127 |
| 6,085,244 | A * | 7/2000 | Wookey | 709/224 |
| 6,275,942 | B1 * | 8/2001 | Bernhard et al. | 726/22 |
| 6,505,249 | B1 * | 1/2003 | Rehkopf | 709/224 |
| 2002/0023227 | A1 | 2/2002 | Sheymov et al. | |
| 2002/0099300 | A1 * | 7/2002 | Kovtun et al. | 600/509 |
| 2002/0099956 | A1 | 7/2002 | Suzuki | |
| 2002/0144135 | A1 | 10/2002 | Langford et al. | |
| 2002/0144156 | A1 * | 10/2002 | Copeland, III | 713/201 |
| 2003/0037252 | A1 * | 2/2003 | Abrams | 713/200 |
| 2003/0074567 | A1 | 4/2003 | Charbonneau | |
| 2003/0145200 | A1 * | 7/2003 | Eden | 713/161 |
| 2003/0167411 | A1 | 9/2003 | Mackawa | |
| 2003/0188189 | A1 | 10/2003 | Desai et al. | |
| 2003/0200308 | A1 | 10/2003 | Tameda et al. | |
| 2003/0200462 | A1 | 10/2003 | Munson | |
| 2004/0003294 | A1 | 1/2004 | Moore | |
| 2004/0010701 | A1 | 1/2004 | Umebayashi et al. | |
| 2004/0024736 | A1 | 2/2004 | Sakamoto et al. | |

FOREIGN PATENT DOCUMENTS

WO    WO 03/100619    12/2003

* cited by examiner

*Primary Examiner*—Gilberto Barron, Jr.
*Assistant Examiner*—Cordelia Kane
(74) *Attorney, Agent, or Firm*—Tucker Ellis & West LLP

(57) ABSTRACT

This invention is directed to a system and method for monitoring the processes of a document processing peripheral, including unauthorized access thereof. More particularly, this invention is directed to a system and method for monitoring the processes of a document processing peripheral, detecting any unauthorized processes, operations, or usage levels of the document processing peripheral, and then generating a notification of such unauthorized process.

22 Claims, 3 Drawing Sheets

SYSTEM AND METHOD FOR MONITORING PROCESSING IN A DOCUMENT PROCESSING PERIPHERAL

BACKGROUND OF THE INVENTION

This invention is directed to a system and method for monitoring processes in a document processing peripheral. More particularly, this invention is directed to a system and method for detecting unauthorized processes, operations or usage levels, including unauthorized access to a document processing peripheral, and then sending a notification of such unauthorized process.

The management and control of a document processing device, such as a multifunctional peripheral device, is a major task. It is very important to detect any unauthorized processes being performed on a document processing device, including any unauthorized access by a user to a document processing peripheral, before such process damages or interferes with the proper functioning of the document processing peripheral or associated system. Further, it is also imperative to inform an associated system administrator of such unauthorized process as soon as possible so that corrective action may be taken.

The subject invention remedies the afore-noted problems, and provides a mechanism which monitors the processes of a document processing peripheral, detects any unauthorized processes of the document processing peripheral, and generates a notification of such unauthorized process.

SUMMARY OF THE INVENTION

In accordance with the present invention, there is provided a system and method for monitoring processes in a document processing peripheral.

Further, in accordance with the present invention, there is provided a system and method which monitors the processes of a document processing peripheral, detects any unauthorized processes of the document processing peripheral, and generates a notification of such unauthorized process.

Still further, in accordance with the present invention, there is provided a system for monitoring processes in a document processing peripheral. The system comprises monitoring means adapted for monitoring a document processing peripheral and testing means adapted for testing monitored processes against pre-selected criteria. The system also comprises means adapted for selectively generating an authorized process signal in accordance with testing completed by the testing means and notification means adapted for selectively outputting a notification signal in accordance with the authorized process signal.

In a preferred embodiment, the pre-selected criteria includes data stored in a baseline detection matrix. Preferably, the data stored in the baseline detection matrix includes at least one of data representative of CPU usage, process identifiers, process names, child processes, system access parameters, resource usage and communication ports.

In a preferred embodiment, the notification means includes means adapted for sending an electronic mail to at least one selected administrator. In one embodiment, the system includes means adapted for receiving authorize process data from an associated system administrator, wherein the authorized process data is representative of those processes which are authorized. In another embodiment, the system also includes means adapted for receiving triggering data from an associated system administrator, wherein such triggering data is representative of selected operational limits for processes to be authorized.

Still further, in accordance with the present invention, there is provided a method monitoring system utilization, or other processes in a document processing peripheral. The method comprises the steps of monitoring processes in a document processing peripheral and testing monitored processes against pre-selected criteria. The method also comprises the steps of selectively generating an authorized process signal in accordance with testing completed by the testing means and selectively outputting a notification signal in accordance with the authorized process signal.

Preferably, the pre-selected criteria includes data stored in a baseline detection matrix. In a preferred embodiment, the data stored in the baseline detection matrix includes at least one of data representative of CPU usage, resource utilization, process identifiers, process names, child processes and communication ports.

In a preferred embodiment, the step of selectively outputting a notification signal includes sending an electronic mail to at least one selected administrator. In one embodiment, the method further includes the step of receiving authorize process data from an associated system administrator, wherein the authorized process data is representative of those processes which are authorized or the extent to which authorized levels of available resources are used. In another embodiment, the method further comprises the step of receiving triggering data from an associated system administrator, wherein such triggering data is representative of selected operational limits for processes to be authorized.

These and other aspects, advantages, and features of the present invention will be understood by one of ordinary skill in the art upon reading and understanding the specification.

DETAILED DESCRIPTION OF THE PREFERRED EMBODIMENTS

This invention is directed to a system and method for monitoring the processes of a document processing peripheral, including unauthorized access thereof. More particularly, this invention is directed to a system and method for monitoring the processes of a document processing peripheral, detecting any unauthorized processes of the document processing peripheral or resource usage over authorized or preselected levels, and then generating a notification of such unauthorized process.

Figure 1:
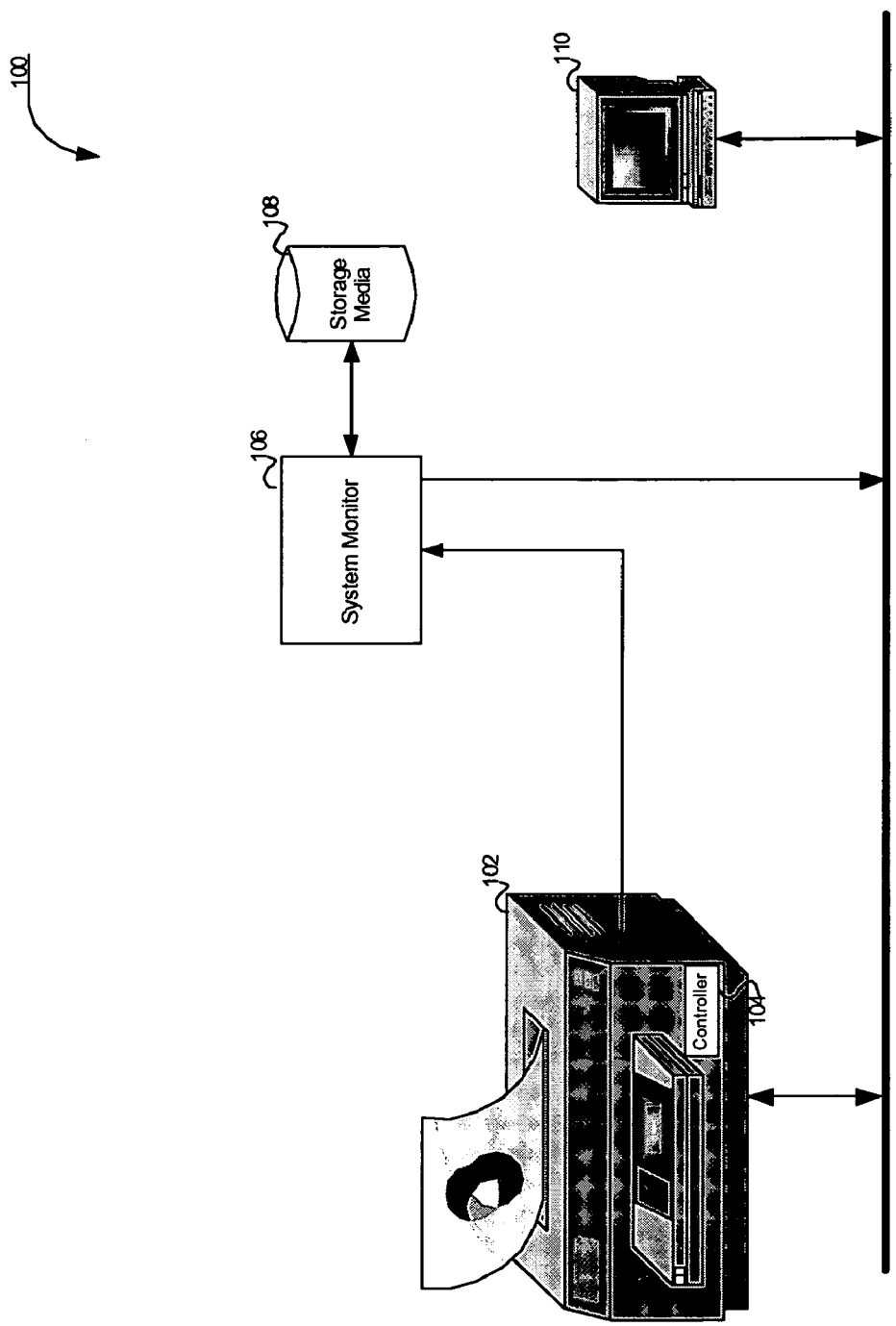
FIG. 1 is a block diagram of the system according to the present invention.

FIG. 1 shows a block diagram preferred embodiment of the system according to the present invention generally designated as 100. The system comprises at least one document processing peripheral, as illustrated by multi-function peripheral device 102, for generating or processing image data. It is to be appreciated that document processing peripheral is any suitable document processing device known in the art, such as a copier, printer, scanner, facsimile and the like, or any combination thereof. Suitable commercially available document processing peripherals include, but are not limited to, the Toshiba e-Studio Series Controller. The document processing peripheral further comprises a controller 104 which controls the functions of the document processing peripheral as will be appreciated by one of ordinary skill in the art.

The document processing peripheral is in data communication with a system monitoring means 106. The system monitoring means monitors the processes of the document processing peripheral via any suitable means known in the art. Examples include, but are not limited to, a dedicated monitoring thread or process in a multitasking or multithreading environment or dedicated hardware/software routine as will be appreciated by one skilled in the art.

The system monitoring means is in data communication with a suitable storage media 108. Suitable storage media include volatile memory, nonvolatile memory, permanent memory, or the like as will be understood by one skilled in the art. The storage media stores the data stored in the base detection matrix and any other related information for determining if the processes being monitored are authorized or if system usage exceeds selected levels. The data stored in the baseline detection matrix includes at least one of data representative of CPU usage, process identifiers, process names, child processes and logical communication ports.

The system monitoring means also includes testing means for testing the monitored processes against pre-selected criteria, such as the baseline detection matrix. The testing means tests the processes via any suitable means known in the art. Such testing is suitably accomplished via a supervisory process or thread, resource monitor or dedicated system snooping or monitoring systems as will be appreciated by one of ordinary skill in the art.

The system monitoring means and the document processing peripheral are also in data communication with an associated administrator interface 110 by which the system administrator accesses or modifies information related to the monitored processes. Preferably, the administrator interface preferably includes a display means for displaying information related to the monitored processes or resources. In one embodiment, the administrator interface is a display means or monitor attached to or associated with the document processing peripheral wherein the user uses the interface to access or modify the information about the monitored processes, acceptable usage levels, and the like. In another embodiment, the system administrator accesses or modifies such information remotely via a remote user interface, such as via a web administrator, connected to the document processing peripheral via any suitable means. It will be appreciated that viable user interfaces may take various forms, such as touch screen, keypads, pen input, and the like.

The system monitoring means also includes means for generation a notification as to the authorization status of the processes based on the result of the testing means. Such notification is generated by any suitable means known in the art. Preferably, the notification is transmitted to an associated system administrator via any suitable means. In a preferred embodiment, the notification is sent to the system administrator via electronic mail which is received by the system administrator at the administrator interface via any suitable means. However, it is to be appreciated that any other notification mechanism is suitably used, such as a page message, phone message, wireless message, network messaging, and the like.

Figure 2:
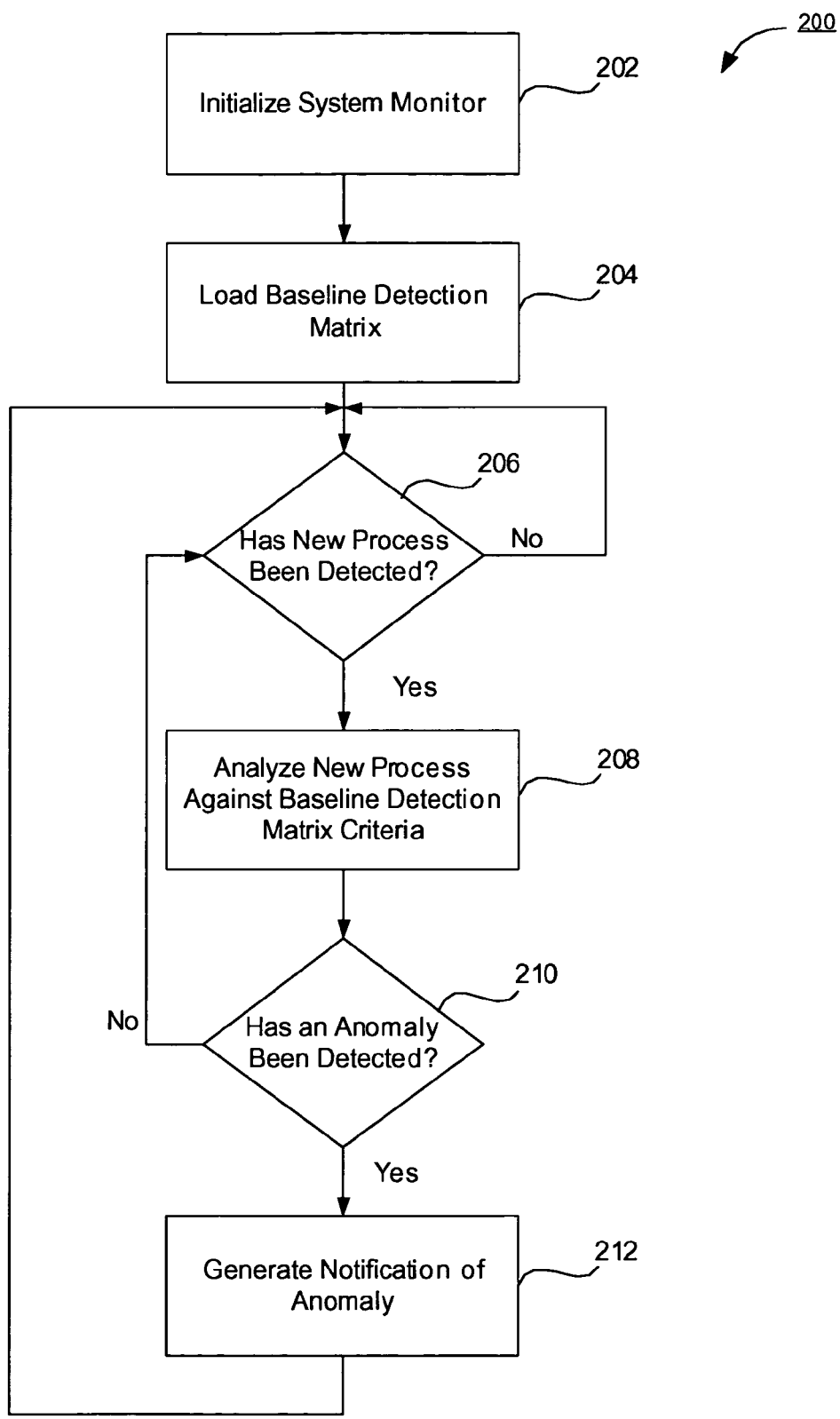
FIG. 2 is a flow chart illustrating the method according to the present invention.

FIG. 2 illustrates a flowchart 200 for monitoring the processes of the document processing peripheral. At 202, the system monitoring means is available to start the monitoring and detecting process. At 204, the baseline detection matrix is loaded from the storage media for use in the monitoring process.

Figure 3:
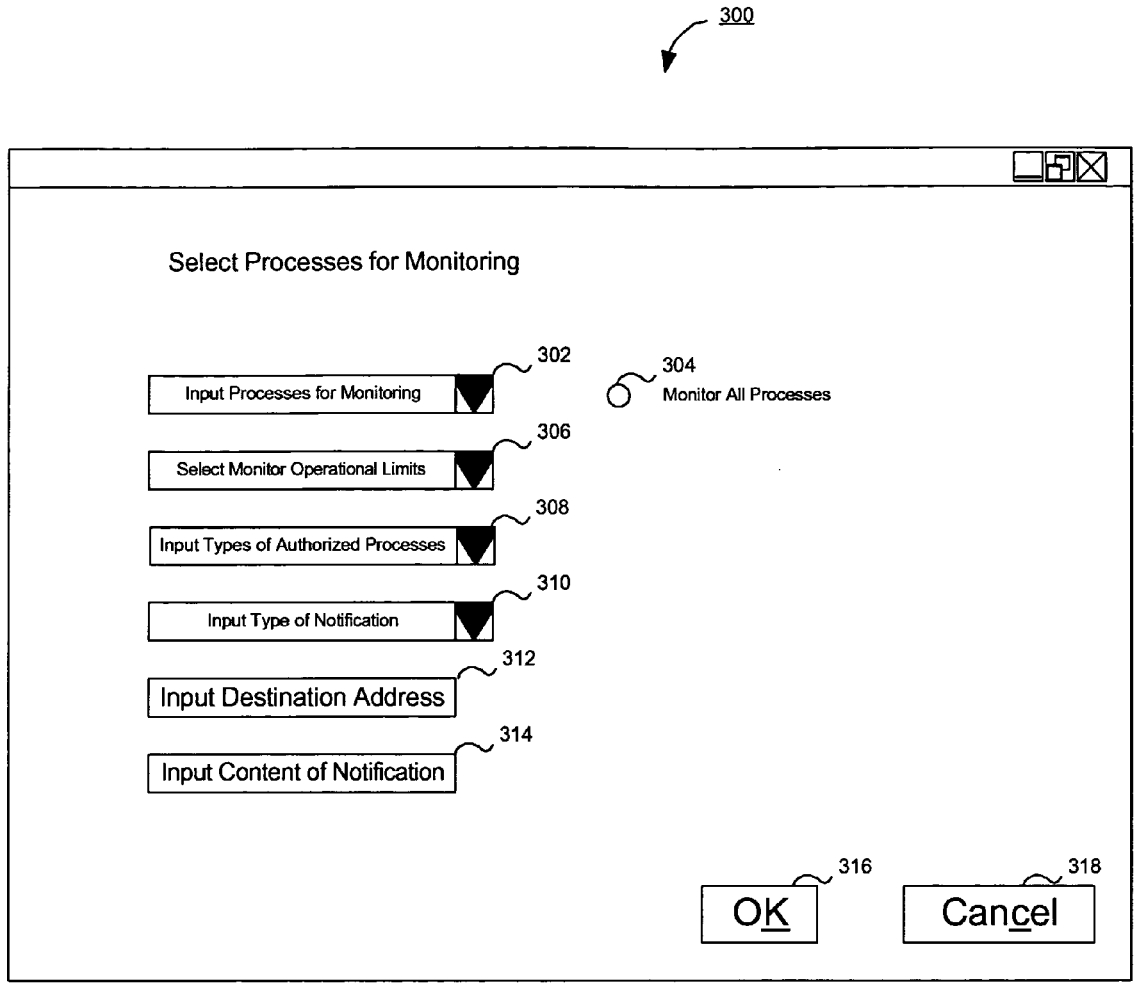
FIG. 3 is a sample template for selecting the parameters for monitoring the processes of a document processing peripheral.

In one embodiment, the system administrator has the ability to select at least one of which processes are to monitored, which processes are to be considered authorized processes, and the operational limitations for such processes or acceptable usage levels for system resources. These selections are input into the baseline detection matrix via any suitable means for use in the monitoring process. FIG. 3 is a sample template 300 for selecting such parameters. At 302, the system administrator inputs those processes that are to be monitored via any suitable means. If the system administrator desires all processes to be monitored, the system administrator checks the box 304. At 306, the system administrator inputs the types of processes which are to be considered authorized via any suitable means. At 308, the system administrator selects the operational limits for the processes being monitored. If the process is not within those limits, than the process is considered unauthorized. At 310, the system administrator inputs the type of notification to be received, such as electronic mail notification, paging notification, and the like. At 312, the system administrator inputs the address or location where the notification is to be transmitted. At 314, the system administrator inputs the type of information to be received in the notification. If the system administrator desires to save the selections, the system administrator selects the OK button at 316. If the system administrator desires to cancel the selection, the system administrator selects the Cancel Button at 318.

At 206, the system monitors the processes of the document processing peripheral for new processes via any suitable means. By way of example, a continuous monitor, timed monitor, interrupt driven monitor or event driven monitor is suitably implemented in connection with the forgoing. If a new process is not detected, the system continues monitoring until a new process is detected.

If a new process is detected, flow proceeds to 208, wherein the system analyzes such new process against the criteria in the baseline detection matrix for any anomalies, errors, excess usage levels or intrusions in the process via any suitable means. This information is suitably supplemented with information associated with the triggering event, such as degree of usage, actual process affected, and the like. If no anomalies are detected at step 210, flow proceeds back to 206, wherein the system returns to monitoring for new processes.

If an anomaly is detected at step 210, flow proceeds to 212 wherein a notification of the anomaly is generated via any suitable means. Preferably, the notification is transmitted to the system administrator via any suitable means. The process then returns to 206, wherein the system returns to monitoring for new processes.

As those skilled in the art can readily appreciate, the present invention may be implemented as a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed:

1. A system for monitoring processes in a document processing peripheral comprising:

a monitoring means comprised of a process thread adapted for concurrently monitoring a plurality of individual software processes running concurrently therewith on a processor of a multi-threaded document processing peripheral during operation thereof, each process including at least one of a base process thread, a child process thread, and a port communication process thread;

the monitoring means further comprising means adapted for monitoring commencement of new processes running on the processor in the document processing peripheral during operation thereof;

a memory adapted for storing a baseline detection matrix populated with data representative of preselected authorized processes as determined by CPU usage, process identifiers, process names, child processes, and communication processes;

testing means adapted for testing monitored processes and commenced new processes against data stored in the baseline detection matrix;

means adapted for selectively generating an authorized process signal in accordance with testing completed by the testing means; and notification means adapted for selectively outputting a notification signal in accordance with the authorized process signal that the testing means has determined an existence of an active, unauthorized process thread.

2. The system for monitoring processes in a document processing peripheral of claim 1 wherein the notification means includes means adapted for sending an electronic mail to at least one selected administrator.

3. The system for monitoring processes in a document processing peripheral of claim 1 further comprising means adapted for receiving authorized process data from an associated system administrator, wherein the authorized process data is representative of those processes which are authorized.

4. The system for monitoring processes in a document processing peripheral of a claim 1 further comprising means adapted for receiving triggering data from an associated system administrator, wherein such triggering data is representative of selected operational limits for processes to be authorized.

5. The system for monitoring processes in a document processing peripheral of claim 1 wherein the document processing peripheral includes a printing device, a copying device, a scanning device, a facsimile, and a multifunctional peripheral.

6. The system for monitoring processes in a document processing peripheral of claim 1 further comprising display means adapted for displaying selected information about the processes being monitored.

7. The system for monitoring processing in a document processing peripheral of claim 6 wherein the display means are associated with the document processing peripheral.

8. A method for monitoring processes in a document processing peripheral comprising the steps of:

concurrently monitoring a plurality of individual software processes running concurrently therewith on a processor of a multi-threaded document processing peripheral during operation thereof, each process including at least one of a base process thread, a child process thread, and a port communication process thread;

monitoring commencement of new processes running on the processor in the document processing peripheral during operation thereof;

storing a baseline detection matrix populated with data representative of preselected authorized processes as determined by CPU usage, process identifiers, process names, child processes, and communication processes;

testing monitored processes and commenced new processes against data stored in the baseline detection matrix;

selectively generating an authorized process signal in accordance with testing completed by the testing; and selectively outputting a notification signal in accordance with the authorized process signal that the testing has determined an existence of an active, unauthorized process thread.

9. The method for monitoring processes in a document processing peripheral of claim 8 wherein the step of selectively outputting a notification signal includes sending an electronic mail to at least one selected administrator.

10. The method for monitoring processes in a document processing peripheral of claim 8 further comprising the step of receiving authorized process data from an associated system administrator, wherein the authorized process data is representative of those processes which are authorized.

11. The method for monitoring processes in a document processing peripheral of a claim 8 further comprising the step of receiving triggering data from an associated system administrator, wherein such triggering data is representative of selected operational limits for processes to be authorized.

12. The method for monitoring processes in a document processing peripheral of claim 8 wherein the document processing peripheral includes a printing device, a copying device, a scanning device, a facsimile, and a multifunctional peripheral.

13. The method for monitoring processes in a document processing peripheral of claim 8 further comprising the step of displaying selected information about the processes being monitored.

14. The method for monitoring processing in a document processing peripheral of claim 13 wherein the selected information about the processes being monitored is displayed via display means are associated with the document processing peripheral.

15. A computer-readable medium of instructions with computer readable instructions stored thereon for monitoring processes in a document processing peripheral comprising:

instructions for concurrently monitoring a plurality of individual software processes running concurrently therewith on a processor of a multi-threaded document processing peripheral during operation thereof, each process including at least one of a base process thread, a child process thread, and a port communication process thread;

instructions for monitoring commencement of new processes running on the processor in the document processing peripheral during operation thereof;

instructions for storing a baseline detection matrix populated with data representative of preselected authorized processes as determined by CPU usage, process identifiers, process names, child processes, and communication processes;

instructions for testing monitored processes and commenced new processes against data stored in the baseline detection matrix;

instructions for selectively generating an authorized process signal in accordance with testing completed by the testing; and instructions for selectively outputting a notification signal in accordance with the authorized process signal that the testing has determined an existence of an active, unauthorized process thread.

16. The computer-readable medium of instructions with computer readable instructions stored thereon for monitoring processes in a document processing peripheral of claim 15 wherein the instructions for selectively outputting a notification signal include instructions for sending an electronic mail to at least one selected administrator.

17. The computer-readable medium of instructions with computer readable instructions stored thereon for monitoring processes in a document processing peripheral of claim 15 further instructions for receiving authorized process data from an associated system administrator, wherein the authorized process data is representative of those processes which are authorized.

18. The computer-readable medium for monitoring processes in a document processing peripheral of a claim 15 further instructions for receiving triggering data from an associated system administrator, wherein such triggering data is representative of selected operational limits for processes to be authorized.

19. A computer-implemented method for monitoring processes in a document processing peripheral comprising the steps of:

concurrently monitoring a plurality of individual software processes running concurrently therewith in a processor of a multi-threaded document processing peripheral during operation thereof, each process including at least one of base process thread, a child process thread, and a port communication process thread;

monitoring commencement of new process running on the processor in the document processing peripheral during operation thereof;

storing a baseline detection matrix populated with data representative of preselected authorized processes as determined by CPU usage, process identifiers, process names, child processes, and communication processes;

testing monitored processes and commenced new processes against data stored in the baseline detection matrix;

selectively generating an authorized process signal in accordance with testing completed by the testing; and selectively outputting a notification signal in accordance with the authorized process signal that the testing has determined an existence of an active, unauthorized process thread.

20. The compute-implemented method for monitoring processes in a document processing peripheral of claim 19 wherein the step of selectively outputting a notification signal includes sending an electronic mail to at least one selected administrator.

21. The computer-implemented method for monitoring processes in a document processing peripheral of claim 19 further comprising the step of receiving authorized process data from an associated system administrator, wherein the authorized process data is representative of those processes which are authorized.

22. The computer-implemented method for monitoring processes in a document processing peripheral of a claim 19 further comprising the step of receiving triggering data from an associated system administrator, wherein such triggering data is representative of selected operational limits for processes to be authorized.

* * * * *

UNITED STATES PATENT AND TRADEMARK OFFICE
CERTIFICATE OF CORRECTION

| | | |
|---|---|---|
| PATENT NO. | : 7,665,133 B2 | Page 1 of 1 |
| APPLICATION NO. | : 10/866337 | |
| DATED | : February 16, 2010 | |
| INVENTOR(S) | : Girish R. Krishna | |

It is certified that error appears in the above-identified patent and that said Letters Patent is hereby corrected as shown below:

In Claim 20, Column 8, starting at line 14, please replace the claim as follows:

--20. The computer-implemented method for monitoring processes in a document processing peripheral of claim 19 wherein the step of selectively outputting a notification signal includes sending an electronic mail to at least one selected administrator.--

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO.       : 7,665,133 B2
APPLICATION NO.  : 10/866337
DATED            : February 16, 2010
INVENTOR(S)      : Girish R. Krishna It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this

Twenty-eighth Day of December, 2010

David J. Kappos
*Director of the United States Patent and Trademark Office*